United States Patent
Yang

(10) Patent No.: US 11,627,404 B2
(45) Date of Patent: Apr. 11, 2023

(54) WIRELESS EARPHONE LINKING METHOD AND APPARATUS AND WIRELESS EARPHONE

(71) Applicant: GOERTEK INC., Shandong (CN)

(72) Inventor: Pei Yang, Shandong (CN)

(73) Assignee: GOERTEK INC., Weifang (CN)

(*) Notice: Subject to any disclaimer, the term of this patent is extended or adjusted under 35 U.S.C. 154(b) by 158 days.

(21) Appl. No.: 17/274,581

(22) PCT Filed: Dec. 27, 2018

(86) PCT No.: PCT/CN2018/124262
§ 371 (c)(1),
(2) Date: Mar. 9, 2021

(87) PCT Pub. No.: WO2020/052164
PCT Pub. Date: Mar. 19, 2020

(65) Prior Publication Data
US 2022/0053256 A1 Feb. 17, 2022

(30) Foreign Application Priority Data
Sep. 14, 2018 (CN) .......... 201811075172.X

(51) Int. Cl.
*H04R 1/10* (2006.01)
*G06F 3/0338* (2013.01)

(52) U.S. Cl.
CPC ......... *H04R 1/1041* (2013.01); *G06F 3/0338* (2013.01); *H04R 2420/05* (2013.01); *H04R 2420/07* (2013.01)

(58) Field of Classification Search
CPC .......... H04R 1/1041; G06F 3/0338
See application file for complete search history.

(56) References Cited

U.S. PATENT DOCUMENTS

| 2007/0135163 | A1 | 6/2007 | Lee | |
| 2015/0287421 | A1* | 10/2015 | Benway | H04K 3/825 704/226 |
| 2018/0132028 | A1* | 5/2018 | Nakai | H04R 1/1041 |

FOREIGN PATENT DOCUMENTS

| CN | 103167365 | 6/2013 |
| CN | 106210961 | 12/2016 |
| CN | 106453791 | 2/2017 |
| CN | 106714018 | 5/2017 |
| CN | 106788539 | 5/2017 |
| CN | 107027340 | 8/2017 |
| CN | 107105358 | 8/2017 |
| CN | 206370927 | 8/2017 |

(Continued)

OTHER PUBLICATIONS

International Search Report issued in PCT/CN2018/124262 dated May 31, 2019.

*Primary Examiner* — Simon King
(74) *Attorney, Agent, or Firm* — Workman Nydegger

(57) ABSTRACT

Disclosed is a wireless earphone linking method that includes the following: detecting a motion state of a wireless earphone; when the wireless earphone is moved, determining whether a working mode of the wireless earphone is a wearing mode; if so, determining whether the wireless earphone and a terminal are in a linked state; and if the wireless earphone and the terminal are not in a linked state, controlling the wireless earphone to send a linking request to the terminal.

11 Claims, 6 Drawing Sheets

(56) References Cited

FOREIGN PATENT DOCUMENTS

| EP | 3240269 | 11/2017 |
|---|---|---|
| WO | WO2016013806 | 1/2016 |

\* cited by examiner

WIRELESS EARPHONE LINKING METHOD AND APPARATUS AND WIRELESS EARPHONE

This application is a 371 application of International Application No. PCT/CN2018/124262, filed Dec. 27, 2018, which claims priority to Chinese Patent Application No. 201811075172.X, entitled "WIRELESS EARPHONE LINKING METHOD AND APPARATUS AND WIRELESS EARPHONE", filed Sep. 14, 2018 with the China National Intellectual Property Administration (CNIPA), which are incorporated herein by reference in their entirety.

TECHNICAL FIELD

The present disclosure relates to the technical field of a wireless headset, and particularly, to a method and device for connecting a wireless headset, and a wireless headset.

BACKGROUND

Due to rapid development of artificial intelligence technology in recent years, smart wearable products obtain unprecedented opportunities for development. Products are diversified and have more and more functions. A true wireless stereo (TWS) wireless headset develops rapidly, its shipment grows exponentially, and its development prospect is very good. Implement of TWS technology is based on development of chip technology, which means that a mobile phone is connected to a master headset, and the master headset is connected to a slave headset wirelessly, to realize true wireless separation of left and right channels.

In order to improve battery life of the wireless headset and reduce power consumption of the headset, a timeout mechanism is used when a wireless connection between the headset and a terminal is disconnected due to a signal problem, which means link loss. Within a period of time, the headset tries to reconnect automatically. The master and slave headsets enter a low-power state if timeout and reconnection can only be triggered through a headset box. If there is a physical button on the headset, the reconnection can be triggered by the button. As a result, when the headset is disconnected from the terminal, the user needs to actively trigger the reconnection through the headset box or the button, and there is a delay from the time when the user wears the wireless headset to the time when the wireless headset can be used, which greatly affects user experience.

Therefore, how to improve the user experience in a process of wireless headset reconnection is a technical problem that needs to be solved by those skilled in the art.

SUMMARY

An object of the present disclosure is to provide a method and device for connecting a wireless headset, and a wireless headset, to improve user experience in the process of wireless headset reconnection.

In order to solve the above technical problems, a method for connecting a wireless headset is provided in the present disclosure. The method includes:

detecting a motion state of the wireless headset;

when the wireless headset is in motion, determining whether a working mode of the wireless headset is a wearing mode;

if the working mode of the wireless headset is the wearing mode, determining whether the wireless headset is in a connection state with a terminal; and if the wireless headset is not in the connection state with the terminal, controlling the wireless headset to send a connection request to the terminal.

Optionally, when the working mode of the wireless headset is not the wearing mode, the method further includes:

before determining whether the wireless headset is in the connection state with the terminal, calling an infrared sensor to detect whether the wireless headset is blocked;

when the wireless headset is blocked, calling an accelerometer to collect an acceleration value of the wireless headset;

determining whether the wireless headset meets an entering-into-ear condition according to the acceleration value;

if the wireless headset meets the entering-into-ear condition, determining whether the wireless headset is in a headset box; and if the wireless headset is not in the headset box, changing the working mode of the wireless headset to the wearing mode.

Optionally, the determining whether the wireless headset meets the entering-into-ear condition according to the acceleration value includes:

building an entering-into-ear behavior analysis model;

analyzing the acceleration value by using the entering-into-ear behavior analysis model to obtain an analysis result; and determining whether the wireless headset meets the entering-into-ear condition according to the analysis result.

Optionally, before determining whether the wireless headset is in a disconnection state with the terminal, the method further includes:

determining whether the wireless headset is in a connection state with an opposite wireless headset;

if the wireless headset is in the connection state with the opposite wireless headset, obtaining an ADDP/HFP state of the opposite wireless headset;

determining whether the opposite wireless headset is in the connection state with the terminal according to the ADDP/HFP state; and if the opposite wireless headset is not in the connection state with the terminal, entering a step of determining whether the wireless headset is in the disconnection state with the terminal.

Optionally, after controlling the wireless headset to send the connection request to the terminal, the method further includes:

determining whether the wireless headset is in the connection state with the terminal again within a preset time;

if the wireless headset is not in the connection state with the terminal, controlling the wireless headset to resend the connection request to the terminal, and recording number of times the connection request is sent; and when the number of times exceeds a threshold, sending an error message to a designated location.

A device for connecting a wireless headset is also provided in the present disclosure. The device includes:

a detecting unit, configured to detect a motion state of the wireless headset;

a first determining unit, configured to, when the wireless headset is in motion, determine whether a working mode of the wireless headset is a wearing mode;

a second determining unit, configured to, when the working mode of the wireless headset is the wearing mode, determine whether the wireless headset is in a connection state with a terminal; and a sending unit, configured to, if the wireless headset is not in the connection state with the terminal, control the wireless headset to send a connection request to the terminal.

Optionally, the device further includes:

a first calling unit, configured to call an infrared sensor to detect whether the wireless headset is blocked;

a second calling unit, configured to, when the wireless headset is blocked, call an accelerometer to collect an acceleration value of the wireless headset;

a third determining unit, configured to determine whether the wireless headset meets an entering-into-ear condition according to the acceleration value;

a fourth determining unit, configured to, when the wireless headset meets the entering-into-ear condition, determine whether the wireless headset is in a headset box; and a mode changing unit, configured to, if the wireless headset is not in the headset box, change the working mode of the wireless headset to the wearing mode.

Optionally, the third determining unit includes:

a building subunit, configured to build an entering-into-ear behavior analysis model;

an analysis subunit, configured to analyze the acceleration value by using the entering-into-ear behavior analysis model to obtain an analysis result; and a determining subunit, configured to determine whether the wireless headset meets the entering-into-ear condition according to the analysis result.

Optionally, the device further includes:

a fifth determining unit, configured to determine whether the wireless headset is in a connection state with an opposite wireless headset;

an obtaining unit, configured to, when the wireless headset is in the connection state with the opposite wireless headset, obtain an ADDP/HFP state of the opposite wireless headset;

a sixth determining unit, configured to determine whether the opposite wireless headset is in the connection state with the terminal according to the ADDP/HFP state; and an entry unit, configured to, if the opposite wireless headset is not in the connection state with the terminal, enter a step of determining whether the wireless headset is in the disconnection state with the terminal by the second determining unit.

A wireless headset is also provided in the present disclosure. The wireless headset includes:

a memory, configured to store a computer program; and a processor, configured to, when executing the computer program, perform steps of any one of the above method for connecting the wireless headset.

The method for connecting the wireless headset provided in the present disclosure includes detecting a motion state of the wireless headset; when the wireless headset is in motion, determining whether a working mode of the wireless headset is a wearing mode; if so, determining whether the wireless headset is in a connection state with a terminal; and if the wireless headset is not in the connection state with the terminal, controlling the wireless headset to send a connection request to the terminal.

In the technical solution provided by the present disclosure, a motion behavior of the wireless headset is detected. When it is detected that the wireless headset is in motion, it is determined whether the working mode of the wireless headset is the wearing mode, and if so, it is determined whether the wireless headset is in the connection state with the terminal. If the wireless headset is not in the connection state with the terminal, the wireless headset is controlled to send a connection request to the terminal, so that the wireless headset automatically completes the reconnection with the terminal. Compared with the prior art, the present disclosure does not require the user to actively trigger the reconnection through the headset box or a button, and a delay time from when the wireless headset is worn to when the wireless headset can be used is reduced, and the user experience during a reconnection process of the wireless headset is improved. A device for connecting a wireless headset and a wireless headset are also provided in the present disclosure, which also have the above-mentioned beneficial effects, and will not be repeated here.

BRIEF DESCRIPTION OF THE DRAWINGS

In order to more clearly explain the embodiments of the present application or the technical solutions in the prior art, the drawings used in the description of the embodiments or the prior art will be briefly introduced below. Obviously, the drawings in the following description are merely embodiments of the present invention. For those of ordinary skill in the art, other drawings can be obtained according to the provided drawings without paying creative labor.

DETAILED DESCRIPTION

A core of the present disclosure is to provide a method and device for connecting a wireless headset, and a wireless headset, which improve user experience in a process of wireless headset reconnection.

The technical solution according to the embodiments of the present application will be described clearly and completely as follows in conjunction with the accompany drawings in the embodiments of the present application, so that objectives, technical solutions and advantages of the present application can be more clear. It is obvious that the described embodiments are only a part of the embodiments according to the present application, rather than all of the embodiments. All the other embodiments obtained by those skilled in the art based on the embodiments in the present application without any creative work belong to the scope of protection of the present application.

Figure 1:
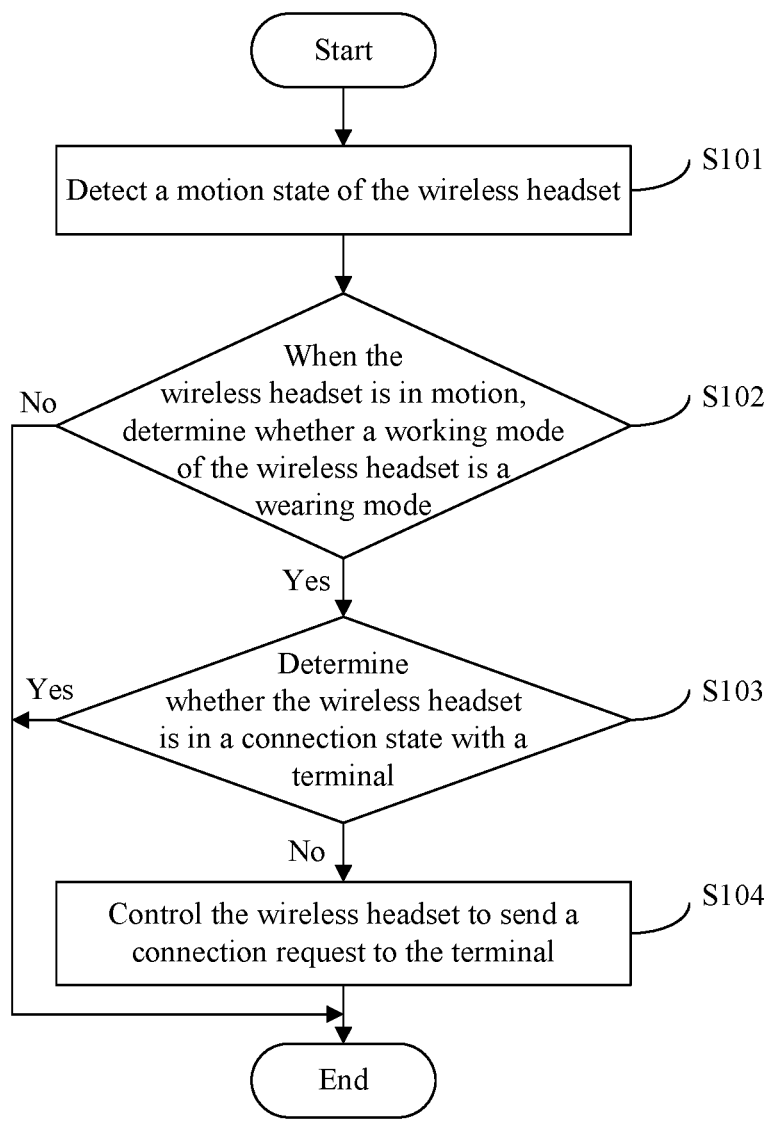
FIG. 1 is a flow chart of a method for connecting a wireless headset according to an embodiment of the present disclosure.

Please refer to FIG. 1, which is a flow chart of a method for connecting a wireless headset according to an embodiment of the present disclosure.

The method includes steps S101 to S104.

In step S101, a motion state of the wireless headset is detected.

An existing wireless headset uses a timeout mechanism. Within a period of time from the headset is disconnected from a terminal, the headset tries to reconnect automatically.

Master and slave headsets enter a low-power state if timeout and reconnection can only be triggered through a headset box. If there is a physical button on the headset, the reconnection can be triggered by the button. As a result, when the headset is disconnected from the terminal, the user needs to actively trigger the reconnection through the headset box or the button, and there is a delay from the time when the user wears the wireless headset to the time when the wireless headset can be used, which greatly affects the user experience. Based on this, the method for connecting the wireless headset is provided in the present disclosure, to solve the above-mentioned problem.

The detection of the motion state of the wireless headset mentioned here may specifically be that obtaining acceleration data in real time through a gravity acceleration sensor, and determining the motion state of the wireless headset according to the acceleration data. For example, when the detected acceleration data is greater than a preset value, it is considered that the wireless headset is currently in motion.

Further, the detection of the motion state of the wireless headset mentioned here may specifically be detecting the motion state of the wireless headset in real time.

In step S102, when the wireless headset is in motion, whether a working mode of the wireless headset is a wearing mode is determined; and if the working mode of the wireless headset is the wearing mode, step S103 is performed.

The wearing mode mentioned here is a working mode of the wireless headset defined in the present disclosure. The wearing mode is a working mode of wireless headset when the user wears the wireless headset. The wireless headset in the wearing mode should maintain a connection with a terminal. When the user wears the wireless headset, it indicates that the user is to use the wireless headset. Therefore, in the present disclosure, when it is detected that the wireless headset is in motion, whether the working mode of the wireless headset at this time is the wearing mode is determined. And if so, it goes to step S103 to determine whether the wireless headset is in a connection state with the terminal.

Optionally, when the working mode of the wireless headset is not the wearing mode, it may determine whether to change the working mode of the wireless headset to the wearing mode by determining whether the wireless headset meets a relevant condition.

In step S103, whether the wireless headset is in the connection state with the terminal is determined; and if the wireless headset is not in the connection state with the terminal, step S104 is performed.

Specifically, the determination of whether the wireless headset is in the connection state with the terminal mentioned here may be made according to A2DP and HFP connection states of the wireless headset and the terminal.

When the wireless headset is in the connection state with the terminal, it indicates that the wireless headset is currently working normally, and no operation is required.

In step S104, the wireless headset is controlled to send a connection request to the terminal.

If the wireless headset is not in the connection state with the terminal, it indicates that the wireless headset is currently not working normally. At this time, the wireless headset is controlled to send the connection request to the terminal, so that the wireless headset automatically completes the reconnection with the terminal.

Preferably, after controlling the wireless headset to send the connection request to the terminal, the method may further include:

determining whether the wireless headset is in the connection state with the terminal again within a preset time;

if the wireless headset is not in the connection state with the terminal, controlling the wireless headset to resend the connection request to the terminal, and recording the number of times the connection request is sent; and when the number of times exceeds a threshold, sending an error message to a designated location.

When the number of times the connection request is sent exceeds the threshold, it indicates that the connection between the wireless headset and the terminal goes wrong. At this time, an error message is sent to the designated location, such as a mailbox or a letter box of the user, so that the user can timely troubleshoot the wireless headset.

Based on the above technical solutions, the method for connecting the wireless headset provided in the present disclosure detects a motion behavior of the wireless headset. When it is detected that the wireless headset is in motion, it is determined whether the working mode of the wireless headset is the wearing mode, and if so, it is further determined whether the wireless headset is in the connection state with the terminal. If the wireless headset is not in the connection state with the terminal, the wireless headset is controlled to send a connection request to the terminal, so that the wireless headset automatically completes the reconnection with the terminal. Compared with the prior art, the present disclosure does not require the user to actively trigger the reconnection through the headset box or a button, and a delay time from when the wireless headset is worn to when the wireless headset can be used is reduced, and the user experience during a reconnection process of the wireless headset is improved.

Based on step S102 in the above embodiment, when the working mode of the wireless headset is not the wearing mode, it may also determine whether the wireless headset meets the relevant condition to determine whether to change the working mode of the headset to the wearing mode before determining whether the wireless headset in the connection state with the terminal, which will be described in detail below with reference to FIG. 2.

Figure 2:
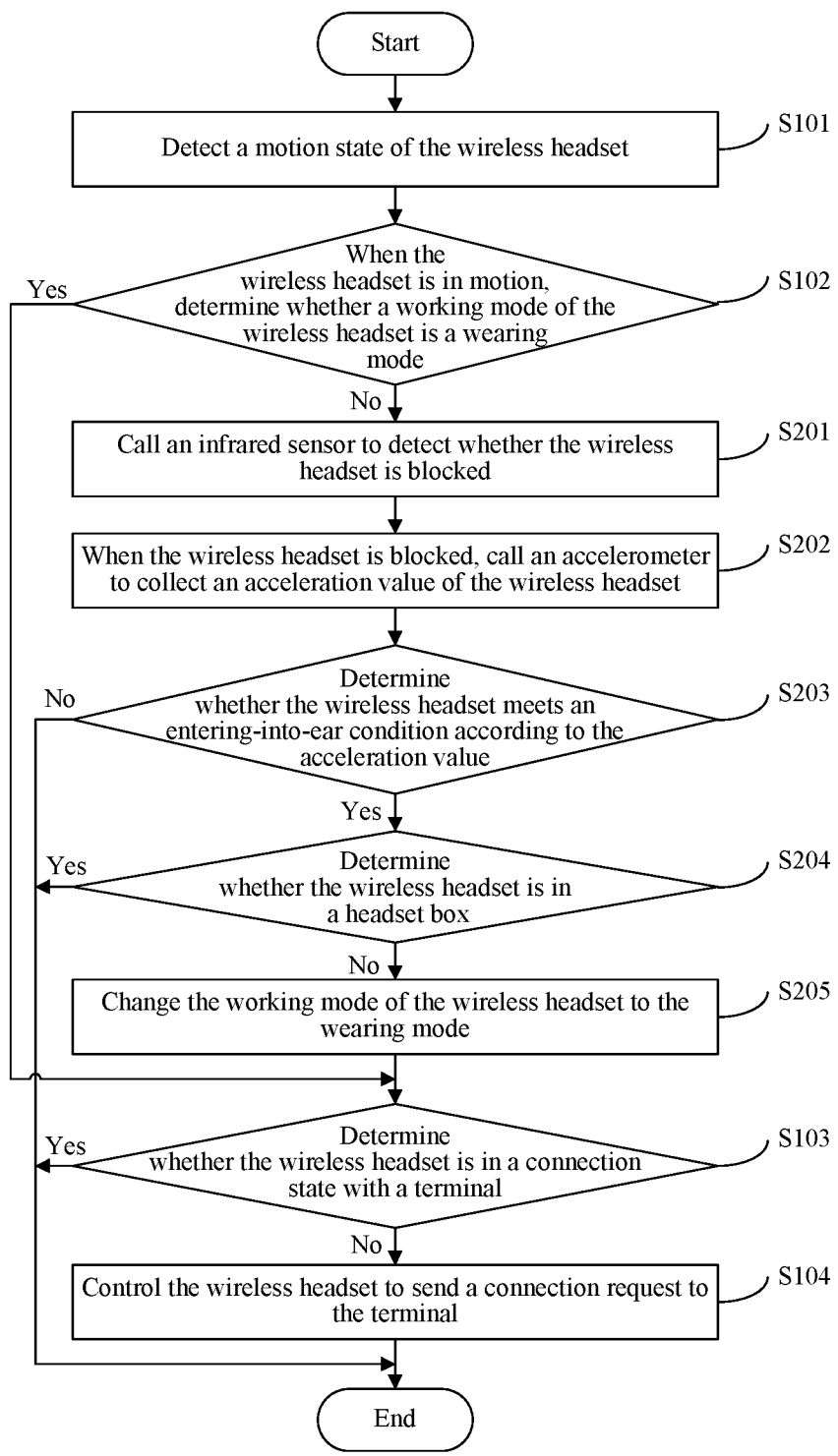
FIG. 2 is a flow chart of another method for connecting a wireless headset according to an embodiment of the present disclosure.

Please refer to FIG. 2, which is a flow chart of another method for connecting the wireless headset according to an embodiment of the present disclosure.

The method specifically includes the following steps.

In step S201, an infrared sensor is called to detect whether the wireless headset is blocked;

if yes, step S202 is performed.

When the wireless headset is in motion, it indicates that the wireless headset is subjected to external force. If the user is wearing the wireless headset, the wireless headset is blocked by a hand of the user at this time. Therefore, the present disclosure calls the infrared sensor to detect whether the wireless headset is blocked when the wireless headset is in motion. If the wireless headset is not blocked, it means that the wireless headset may be accidentally touched by the user or other external force to move.

Further, the calling the infrared sensor to detect whether the wireless headset is blocked mentioned here may specifically be that determining whether the wireless headset is blocked by determining whether a value returned by the infrared sensor is less than a preset value.

In step S202, when the wireless headset is blocked, an accelerometer is called to collect an acceleration value of the wireless headset.

Optionally, the accelerometer mentioned here may be a single-axis acceleration sensor, a dual-axis acceleration sensor, or a three-axis acceleration sensor. To increase an accuracy of the measured acceleration, here take the three-axis acceleration sensor as an example, acceleration in three directions are obtained to calculate a total acceleration value.

Further, in calling the accelerometer to collect the acceleration value of the wireless headset, 50 sets of data may be collected in real time within 1 second to increase an accuracy of determining whether the wireless headset meets an entering-into-ear condition in step S203.

In step S203, whether the wireless headset meets the entering-into-ear condition is determined according to the acceleration value; and if yes, step S204 is performed.

When the wireless headset is blocked, the accelerometer is called to collect the acceleration value of the wireless headset, and whether the wireless headset meets the entering-into-ear condition is determined according to the acceleration value.

Preferably, the determining whether the wireless headset meets the entering-into-ear condition according to the acceleration value mentioned here may specifically be:

building an entering-into-ear behavior analysis model;

analyzing the acceleration value by using the entering-into-ear behavior analysis model to obtain an analysis result; and determining whether the wireless headset meets the entering-into-ear condition according to the analysis result.

For the process of the user being wearing the headset, the entering-into-ear behavior analysis model may be built in advance, and the acceleration value may be analyzed by using the entering-into-ear behavior analysis model to obtain the analysis result. Finally, whether the wireless headset meets the entering-into-ear condition is determined according to the analysis result. For example, when the analysis value of is within a certain preset range, it is considered that the wireless headset meets the entering-into-ear condition.

In step S204, whether the wireless headset is in a headset box is determined; and if not, step S205 is performed.

When the wireless headset meets the entering-into-ear condition, it may also be determined whether the wireless headset is in the headset box. If not, it may be considered that the wireless headset is worn by the user at this time, and step S205 is performed to change the working mode of the wireless headset to the wearing mode.

In step S205, the working mode of the wireless headset is changed to the wearing mode.

Based on step S103 in the above embodiment, before determining whether the wireless headset is in the connection state with the terminal, whether it is necessary to determine whether the wireless headset is in the connection state with the terminal may be determined by determining a connection state of an opposite wireless headset. The following is a detailed description in conjunction with FIG. 3.

Figure 3:
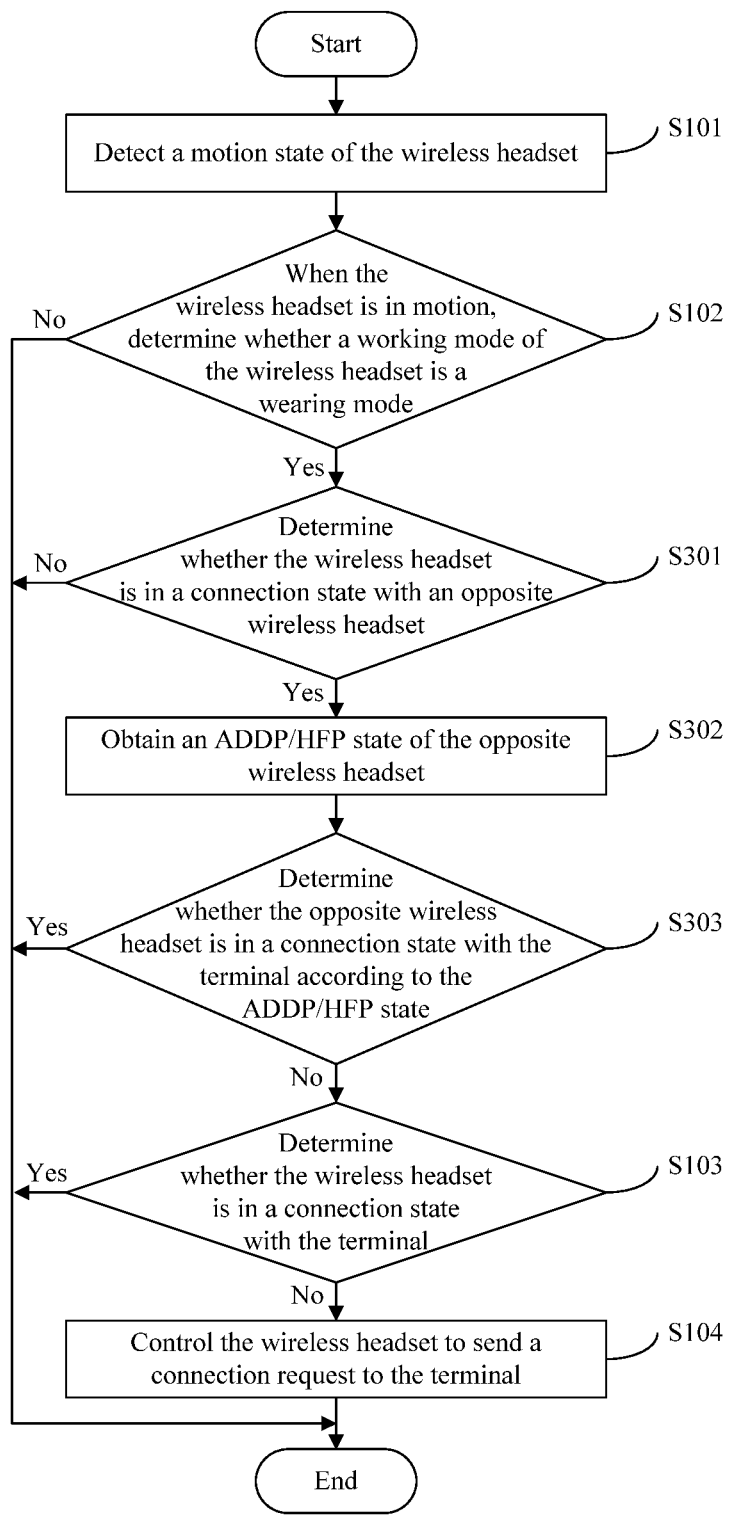
FIG. 3 is a flow chart of another method for connecting a wireless headset according to an embodiment of the present disclosure.

Please refer to FIG. 3, which is a flow chart of another method for connecting the wireless headset according to an embodiment of the present disclosure.

The method specifically includes following steps.

In step S301, whether the wireless headset is in a connection state with an opposite wireless headset is determined; and if yes, step S302 is performed.

A TWS-based wireless headset means that a mobile phone is connected to a master headset, and then the master headset is connected to a slave headset via Bluetooth wirelessly, to achieve true wireless separation of left and right channels of Bluetooth. Therefore, it is necessary to first determine whether the current wireless headset is the master headset, and then determine whether it is necessary to connect the wireless headset to the terminal. If the wireless headset is the slave headset, it does not need to be connected to the terminal, and it may be directly connected to the master headset, that is, the opposite wireless headset.

Whether the wireless headset is in the connection state with the opposite wireless headset mentioned here may be determined by sending a message to the opposite wireless headset and determining whether feedback information is received within a preset time.

If the wireless headset is not in the connection state with the opposite wireless headset, the wireless headset may also be controlled to send a connection request to the opposite headset to complete the connection between the wireless headset and the opposite wireless headset, and then step S302 is performed.

In step S302, an ADDP/HFP state of the opposite wireless headset is obtained.

In step S303, whether the opposite wireless headset is in the connection state with the terminal is determined according to the ADDP/HFP state.

When the wireless headset is in the connection state with the opposite wireless headset, the ADDP/HFP state of the opposite wireless headset is obtained. If the opposite wireless headset is not in the connection state with the terminal, it indicates that the opposite wireless headset is the slave headset, and then the step of determining whether the wireless headset is in the disconnection state with the terminal is performed.

Optionally, when the opposite wireless headset is in the connection state with the terminal, it indicates that the opposite wireless headset is the master headset. In this case, the wireless headset is not required to connect to the terminal.

Figure 4:
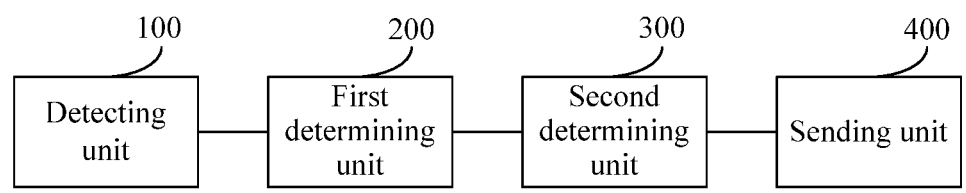
FIG. 4 is a structure diagram of a device for connecting a wireless headset according to an embodiment of the present disclosure.

Please refer to FIG. 4, which is a structure diagram of a device for connecting a wireless headset according to an embodiment of the present disclosure.

The device may include a detecting unit 100, a first determining unit 200, a second determining unit 300, and a sending unit 400.

The detecting unit 100 is configured to detect a motion state of the wireless headset.

The first determining unit 200 is configured to, when the wireless headset is in motion, determine whether a working mode of the wireless headset is a wearing mode.

The second determining unit 300 is configured to, when the working mode of the wireless headset is the wearing mode, determine whether the wireless headset is in a connection state with a terminal.

The sending unit 400 is configured to, if the wireless headset is not in a connection state with the terminal, control the wireless headset to send a connection request to the terminal.

Figure 5:
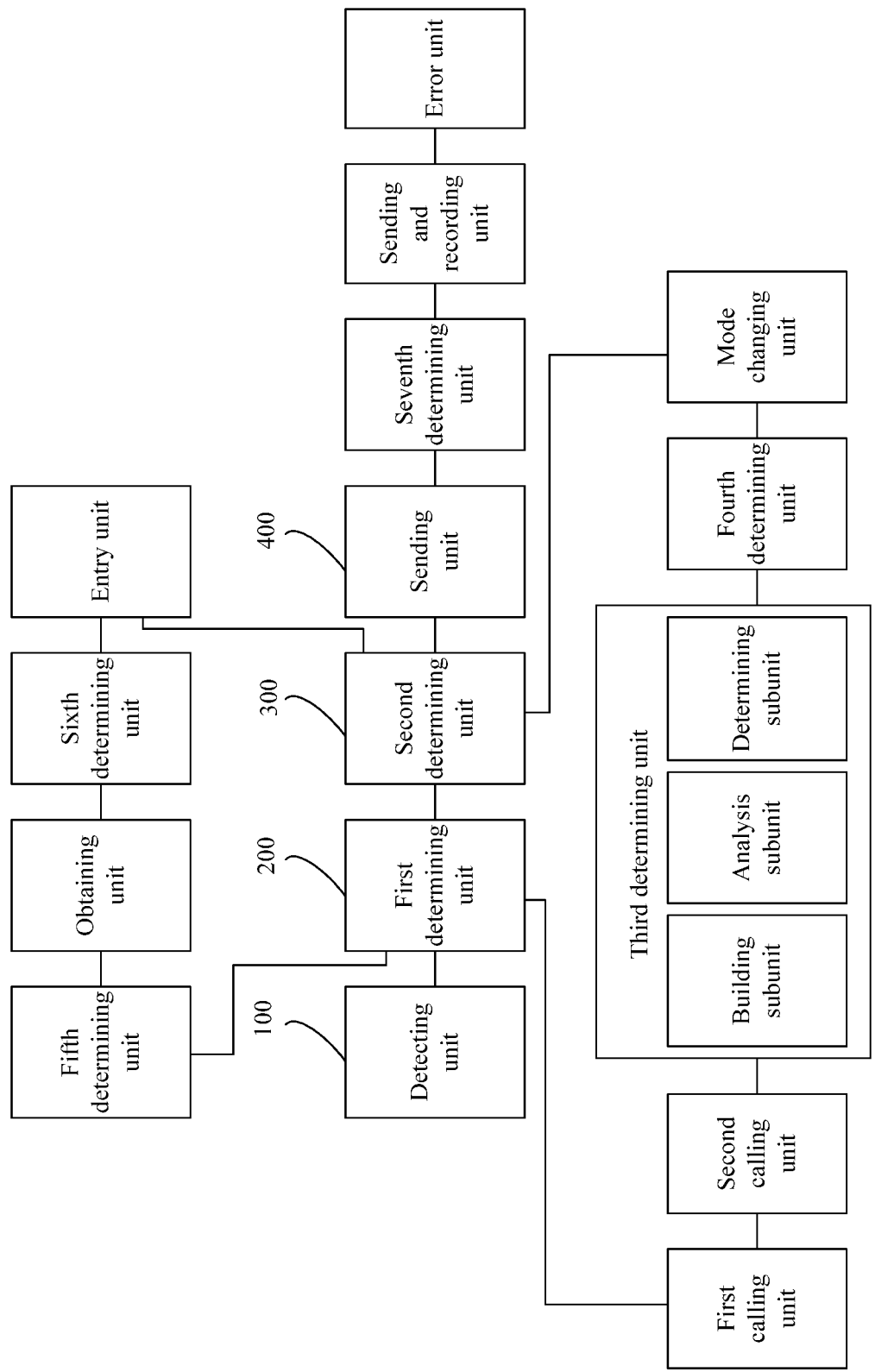
FIG. 5 is a structure diagram of another device for connecting a wireless headset according to an embodiment of the present disclosure.

Please refer to FIG. 5, which is a structure diagram of another device for connecting the wireless headset according to an embodiment of the present disclosure.

The device may further include:

a first calling unit, configured to call an infrared sensor to detect whether the wireless headset is blocked;

a second calling unit, configured to, when the wireless headset is blocked, call an accelerometer to collect an acceleration value of the wireless headset;

a third determining unit, configured to determine whether the wireless headset meets an entering-into-ear condition according to the acceleration value;

a fourth determining unit, configured to, when the wireless headset meets the entering-into-ear condition, determine whether the wireless headset is in a headset box;

a mode changing unit, configured to, if the wireless headset is not in the headset box, change the working mode of the wireless headset to the wearing mode.

The third determining unit may include:

a building subunit, configured to build an entering-into-ear behavior analysis model;

an analysis subunit, configured to analyze the acceleration value by using the entering-into-ear behavior analysis model to obtain an analysis result; and a determining subunit, configured to determine whether the wireless headset meets the entering-into-ear condition according to the analysis result.

The device may further include:

a fifth determining unit, configured to determine whether the wireless headset is in a connection state with an opposite wireless headset;

an obtaining unit, configured to, when the wireless headset is in a connection state with the opposite wireless headset, obtain an ADDP/HFP state of the opposite wireless headset;

a sixth determining unit, configured to determine whether the opposite wireless headset is in a connection state with the terminal according to the ADDP/HFP state; and an entry unit, configured to, if the opposite wireless headset is not in a connection state with the terminal, enter a step of determining whether the wireless headset is in a disconnection state with the terminal by the second determining unit.

The device may further include:

a seventh determining unit, configured to determine whether the wireless headset is in the connection state with the terminal again within a preset time;

a sending and recording unit, configured to, if the wireless headset is not in the connection state with the terminal, control the wireless headset to resend the connection request to the terminal, and record the number of times the connection request is sent; and an error unit, configured to when the number of times exceeds a threshold, send an error message to a designated location.

Since the embodiment of the device corresponds to the embodiment of the method, please refer to the description of the embodiment of the method for the embodiment of the device, which will not be repeated here.

Figure 6:
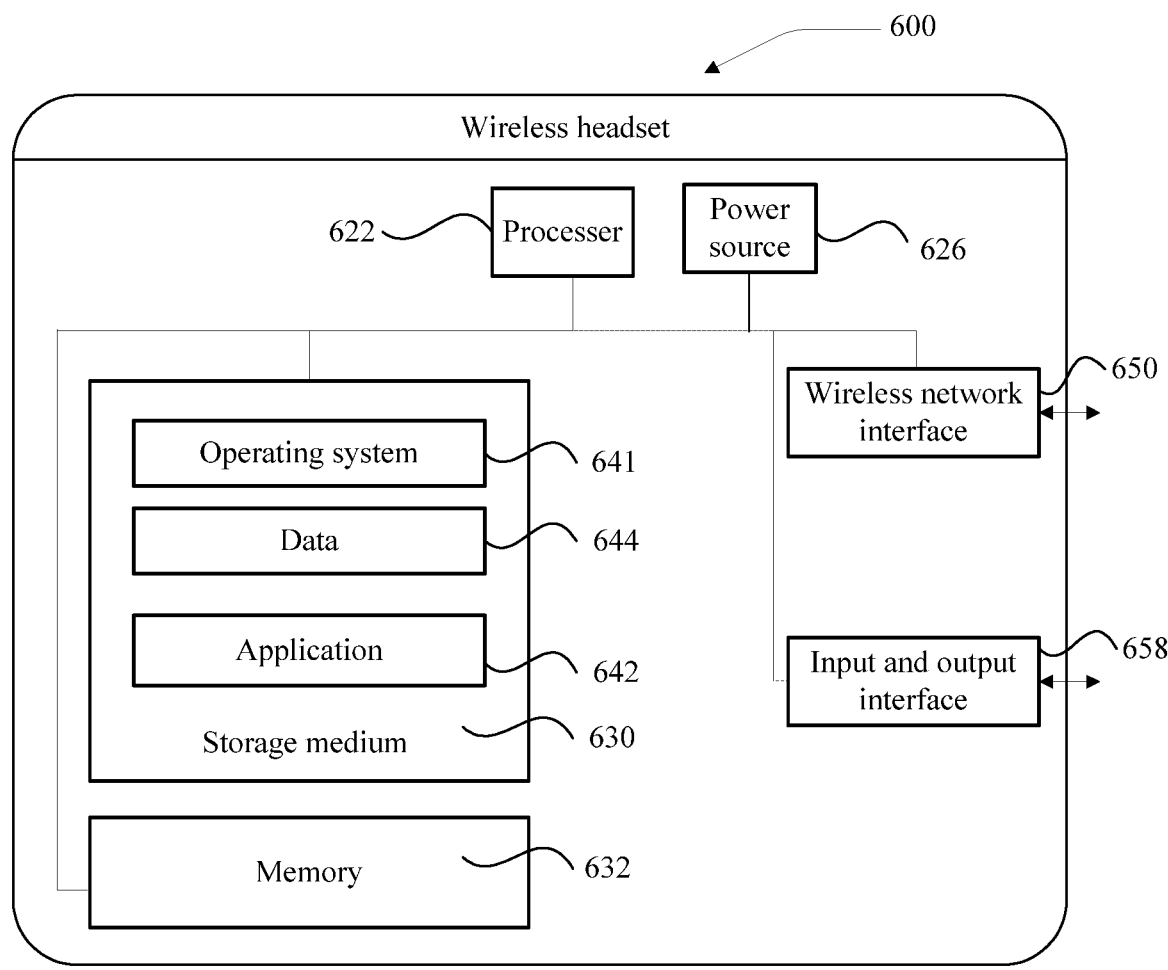
FIG. 6 is a structure diagram of a wireless headset according to an embodiment of the present disclosure.

FIG. 6 is a structure diagram of a wireless headset according to an embodiment of the present disclosure.

The wireless headset may have large differences due to different configurations or performance, and may include one or more central processing units (CPU) 622 and memory 632, and one or more storage media 630 (for example, one or more massive storage wireless headsets) for storing application programs 642 or data 644. The memory 632 and the storage media 630 may be short-term storage or persistent storage. The program stored in the storage media 630 may include one or more modules (not shown in the figure), and each module may include a series of instruction operations on the device. Furthermore, the CPU 622 may be configured to communicate with the storage media 630, and execute on the wireless headset 600 a series of instruction operations in the storage media 630. The wireless headset 600 may also include one or more power sources 626, one or more wireless network interfaces 650, one or more input and output interfaces 658, and/or one or more operating systems 641, such as Android, iOS, and so on.

The steps in the method for connecting the wireless headset described in FIGS. 1 to 3 are implemented by the wireless headset based on the structure illustrated in FIG. 6.

Those skilled in the art can clearly understand that, for the convenience and conciseness of the description, the specific working process of the above-described system, device, and unit may refer to the corresponding process in the foregoing method embodiment, which will not be repeated here.

A readable storage medium is also provided in the present disclosure, the readable storage medium stores a program, and when the program is executed by a processor, steps of the method for connecting the wireless headset according to any one of the embodiments are implemented.

In the several embodiments provided in the present disclosure, it should be understood that the disclosed device, wireless headset, and method may be implemented in other ways. For example, the device embodiments described above are only illustrative, division of units is only a logical function division, and there may be other divisions in actual implementation. For example, multiple units or components may be combined or integrated into another system, or some features may be ignored, or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separate, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in each embodiment of the present disclosure may be integrated into one processing unit, or each unit may exist alone physically, or two or more units may be integrated into one unit. The above-mentioned integrated unit may be implemented in the form of hardware or software functional unit.

The method and device for connecting the wireless headset and the wireless headset provided by the present disclosure are described in detail above. Specific examples are used in this document to describe the principles and implementation of the present disclosure. The description of the above examples is only used to help understand the method and core ideas of the present disclosure. It should be pointed out that for those of ordinary skill in the art, without departing from the principles of the present disclosure, several improvements and modifications may be made to the present disclosure, and these improvements and modifications also fall within the protection scope of the claims of the present disclosure.

It should be noted that, in this specification, the relational terms "first", "second" and the like are used for distinguishing between entities or operations and do not necessarily require or imply any such actual relationship or order between those entities or operations. In addition, terms "include", "comprise" or any other variations are intended to cover non-exclusive "include", thus a process, a method, an object or a device including a series of factors not only include the listed factors, but also include other factors not explicitly listed, or also include inherent factors of the process, the method, the object or the device. Without more limitations, a factor defined by a sentence "include one . . .

" does not exclude a case that there is another same factor in the process, the method, the object or the device including the described factor.

The invention claimed is:

1. A method for connecting a wireless headset, comprising:
   detecting a motion state of the wireless headset;
   when the wireless headset is in motion, determining whether a working mode of the wireless headset is a wearing mode;
   if the working mode of the wireless headset is the wearing mode, determining whether the wireless headset is in a connection state with a terminal; and
   if the wireless headset is not in the connection state with the terminal, controlling the wireless headset to send a connection request to the terminal.

2. The method according to claim 1, wherein when the working mode of the wireless headset is not the wearing mode, the method further comprises: before determining whether the wireless headset is in the connection state with the terminal,
   calling an infrared sensor to detect whether the wireless headset is blocked;
   when the wireless headset is blocked, calling an accelerometer to collect an acceleration value of the wireless headset;
   determining whether the wireless headset meets an entering-into-ear condition according to the acceleration value;
   if the wireless headset meets the entering-into-ear condition, determining whether the wireless headset is in a headset box; and
   if the wireless headset is not in the headset box, changing the working mode of the wireless headset to the wearing mode.

3. The method according to claim 2, wherein the determining whether the wireless headset meets the entering-into-ear condition according to the acceleration value comprises:
   building an entering-into-ear behavior analysis model;
   analyzing the acceleration value by using the entering-into-ear behavior analysis model to obtain an analysis result; and
   determining whether the wireless headset meets the entering-into-ear condition according to the analysis result.

4. The method according to claim 1, wherein before determining whether the wireless headset is in a disconnection state with the terminal, the method further comprises:
   determining whether the wireless headset is in a connection state with an opposite wireless headset;
   if the wireless headset is in the connection state with the opposite wireless headset, obtaining an ADDP/HFP state of the opposite wireless headset;
   determining whether the opposite wireless headset is in a connection state with the terminal according to the ADDP/HFP state; and
   if the opposite wireless headset is not in the connection state with the terminal, entering a step of determining whether the wireless headset is in a disconnection state with the terminal.

5. The method according to claim 1, wherein after controlling the wireless headset to send the connection request to the terminal, the method further comprises:
   determining whether the wireless headset is in the connection state with the terminal again within a preset time;
   if the wireless headset is not in the connection state with the terminal, controlling the wireless headset to resend the connection request to the terminal, and recording number of times the connection request is sent; and
   when the number of times exceeds a threshold, sending an error message to a designated location.

6. A non-transitory computer-readable storage medium, wherein the computer-readable storage medium stores a program, and when the program is executed by a processor, steps of the method for connecting the wireless headset according to claim 1 are implemented.

7. A device for connecting a wireless headset, comprising:
   a detecting unit, configured to detect a motion state of the wireless headset;
   a first determining unit, configured to, when the wireless headset is in motion, determine whether a working mode of the wireless headset is a wearing mode;
   a second determining unit, configured to, when the working mode of the wireless headset is the wearing mode, determine whether the wireless headset is in a connection state with a terminal; and
   a sending unit, configured to, if the wireless headset is not in the connection state with the terminal, control the wireless headset to send a connection request to the terminal.

8. The device according to claim 7, wherein the device further comprises:
   a first calling unit, configured to call an infrared sensor to detect whether the wireless headset is blocked;
   a second calling unit, configured to, when the wireless headset is blocked, call an accelerometer to collect an acceleration value of the wireless headset;
   a third determining unit, configured to determine whether the wireless headset meets an entering-into-ear condition according to the acceleration value;
   a fourth determining unit, configured to, when the wireless headset meets the entering-into-ear condition, determine whether the wireless headset is in a headset box; and
   a mode changing unit, configured to, if the wireless headset is not in the headset box, change the working mode of the wireless headset to the wearing mode.

9. The device according to claim 8, wherein the third determining unit comprises:
   a building subunit, configured to build an entering-into-ear behavior analysis model;
   an analysis subunit, configured to analyze the acceleration value by using the entering-into-ear behavior analysis model to obtain an analysis result; and
   a determining subunit, configured to determine whether the wireless headset meets the entering-into-ear condition according to the analysis result.

10. The device according to claim 7, wherein the device further comprises:
    a fifth determining unit, configured to determine whether the wireless headset is in a connection state with an opposite wireless headset;
    an obtaining unit, configured to, when the wireless headset is in the connection state with the opposite wireless headset, obtain an ADDP/HFP state of the opposite wireless headset;
    a sixth determining unit, configured to determine whether the opposite wireless headset is in the connection state with the terminal according to the ADDP/HFP state; and
    an entry unit, configured to, if the opposite wireless headset is not in the connection state with the terminal, enter a step of determining whether the wireless headset is in the disconnection state with the terminal by the second determining unit.

11. A wireless headset, comprising:
a memory, configured to store a computer program; and
a processor, configured to, when executing the computer program, perform:
detecting a motion state of the wireless headset;
when the wireless headset is in motion, determining whether a working mode of the wireless headset is a wearing mode;
if the working mode of the wireless headset is the wearing mode, determining whether the wireless headset is in a connection state with a terminal; and
if the wireless headset is not in the connection state with the terminal, controlling the wireless headset to send a connection request to the terminal.

\* \* \* \* \*